United States Patent
Heitzler et al.

(10) Patent No.: US 8,695,354 B2
(45) Date of Patent: Apr. 15, 2014

(54) THERMAL FLUX GENERATING DEVICE WITH MAGNETOCALORIC MATERIAL

(75) Inventors: Jean-Claude Heitzler, Horbourg-Wihr (FR); Christian Muller, Strasbourg (FR)

(73) Assignee: Cooltech Applications, Holtzheim (FR)

( * ) Notice: Subject to any disclaimer, the term of this patent is extended or adjusted under 35 U.S.C. 154(b) by 519 days.

(21) Appl. No.: 12/989,815

(22) PCT Filed: Apr. 24, 2009

(86) PCT No.: PCT/FR2009/000484
§ 371 (c)(1),
(2), (4) Date: Oct. 27, 2010

(87) PCT Pub. No.: WO2009/136022
PCT Pub. Date: Nov. 12, 2009

(65) Prior Publication Data
US 2011/0041514 A1 Feb. 24, 2011

(30) Foreign Application Priority Data

Apr. 28, 2008 (FR) ..................................... 08 02369
Jul. 1, 2008 (FR) ..................................... 08 03729

(51) Int. Cl.
*F25B 21/00* (2006.01)

(52) U.S. Cl.
USPC .......................................................... 62/3.1

(58) Field of Classification Search
USPC .......................................................... 62/3.1
See application file for complete search history.

(56) References Cited

U.S. PATENT DOCUMENTS

| 4,727,721 A * | 3/1988 | Peschka et al. ................. 62/3.1 |
| 6,935,121 B2 * | 8/2005 | Fang et al. ....................... 62/3.1 |
| 2005/0120720 A1 | 6/2005 | Fang et al. |
| 2007/0130960 A1 * | 6/2007 | Muller et al. ................... 62/3.1 |

FOREIGN PATENT DOCUMENTS

| WO | 2003/016794 A1 | 2/2003 |
| WO | 2003/050456 A1 | 6/2003 |

OTHER PUBLICATIONS

Bingfeng Yu, Min Liu, Peter W. Egolf, Andrej Kitanovski, 'A review of magnetic refrigerator and heat pump prototypes built before the year 2010', Apr. 14, 2010, International Journal of Refrigeration 33 (2010) 1029-1060.*

* cited by examiner

*Primary Examiner* — Frantz F. Jules
*Assistant Examiner* — Joseph Trpisovsky
(74) *Attorney, Agent, or Firm* — Davis & Bujold, PLLC; Michael J. Bujold

(57) ABSTRACT

The thermal flux generating device (10) with magnetocaloric material comprises an external cylindrical shell (11), made out of metal or any other adequate material, which delimits the inside of the device (10). Inside this shell (11), a rotor (12) is mounted coaxially which consists of a rotary magnetic arrangement, at least one roughly circular ring of elements (13) comprising at least one magnetocaloric material, this ring is positioned coaxially around the rotor (12) and a set of electric coils (14), with radial axes, evenly positioned around the rotor (12) and which make up a stator (15) electrically supplied so as to create a rotating field that rotationally drives the magnetic arrangement.

14 Claims, 13 Drawing Sheets

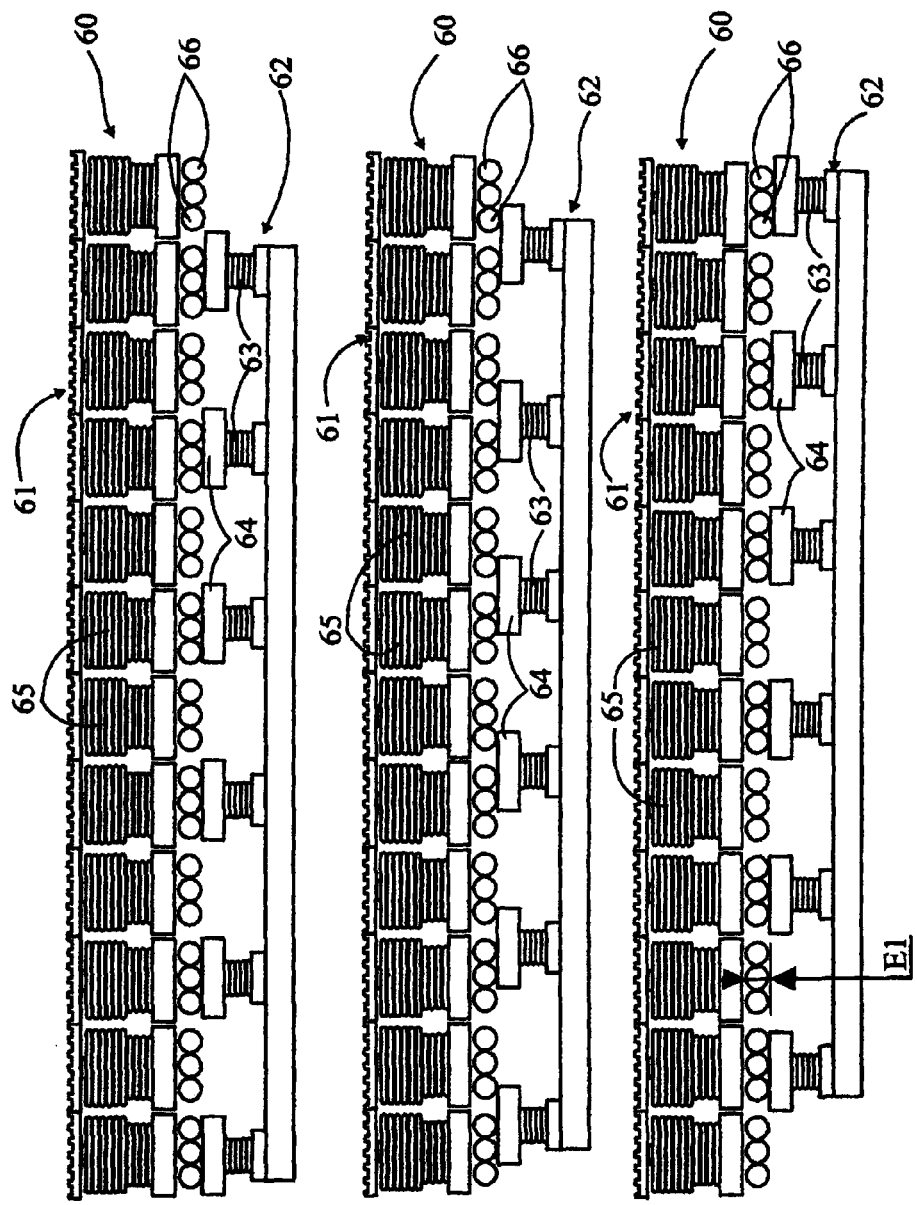

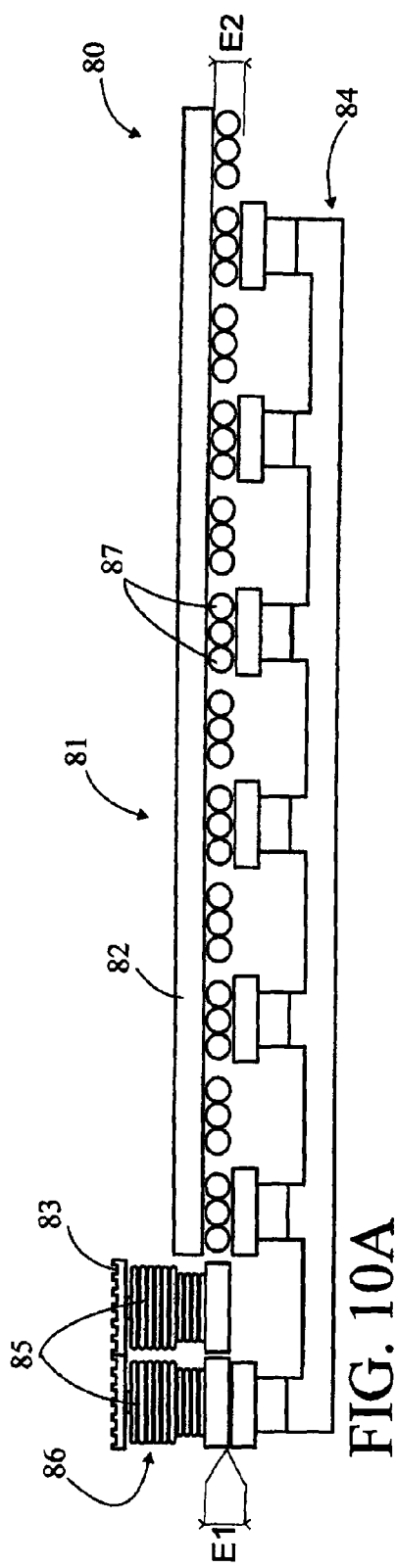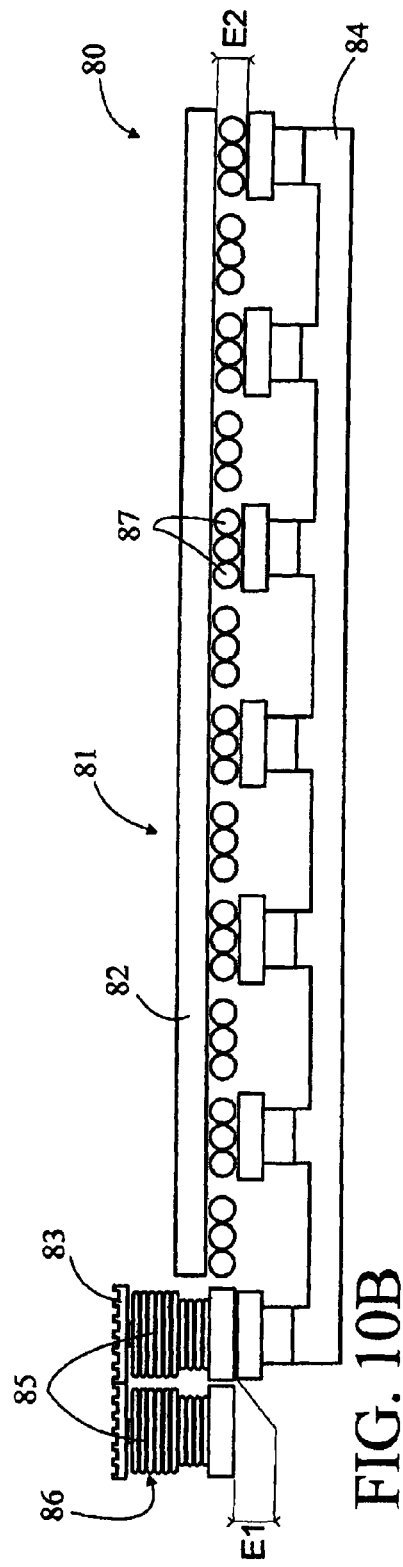
FIG. 10A
FIG. 10B

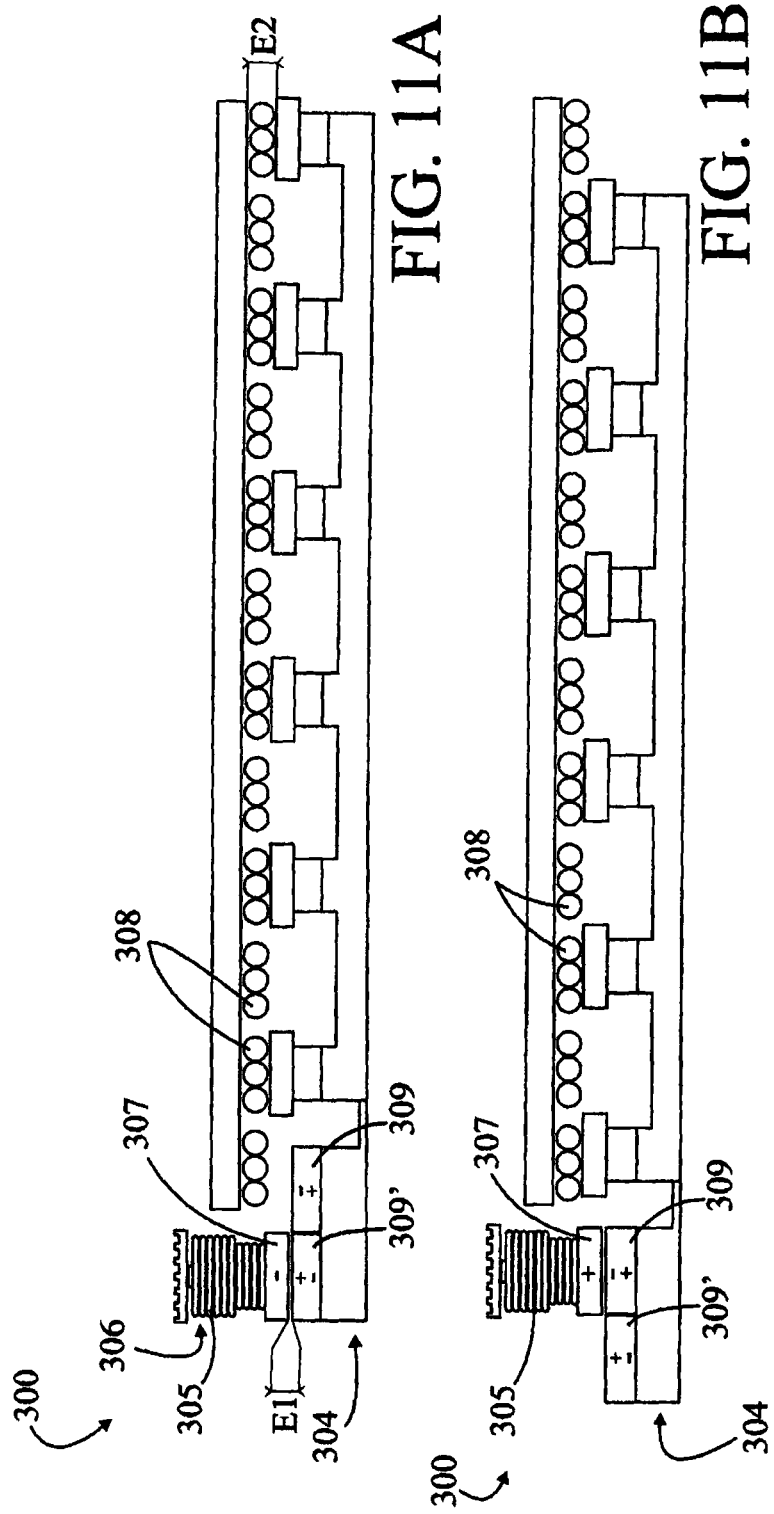

THERMAL FLUX GENERATING DEVICE WITH MAGNETOCALORIC MATERIAL

This application is a National Stage completion of PCT/FR2009/000484 filed Apr. 24, 2009, which claims priority from French patent application serial nos. 08/02369 and 08/03729 filed Apr. 28, 2008 and Jul. 1, 2008 respectively.

FIELD OF THE INVENTION

The present invention relates to a thermal flux generating device with magnetocaloric material comprising at least one thermal flux generating unit housed in an external shell and equipped with at least one thermal element containing at least one magnetocaloric element, with at least one magnetic arrangement arranged so as to generate a magnetic field, with at least one electric drive arranged so as to ensure the movement of the magnetic arrangement in relation to each magnetocaloric element in order to subject it to a variation in magnetic field and to cause its temperature to vary, means to collect the calories and/or frigories emitted by each magnetocaloric element due to the variation in magnetic field, with the electric drive being integrated into the thermal flux generating device with magnetocaloric material and comprising at least one electric coil equipped with a winding supported by an armature and supplied with electric current so as to generate a variation in magnetic field which causes the movement of a mobile assembly that supports the magnetic arrangement.

BACKGROUND OF THE INVENTION

Publication WO-A-03/050456 describes a magnetic refrigeration device with magnetocaloric material which uses two permanent magnets and comprises a one-piece annular enclosure delimiting compartments with magnetocaloric material, for example gadolinium, in porous form, these compartments being separated by joints. Each compartment comprises at least four openings, including an inlet and an outlet connected to a hot circuit on the one hand, and an inlet and an outlet connected to a cold circuit on the other. Both permanent magnets are led into a continuous rotational movement so as to successively sweep the various fixed magnetocaloric material compartments and subject them to variations in magnetic field. The calories and/or frigories emitted by the magnetocaloric material are collected in the hot and cold circuits by heat transfer fluid and sent to heat exchangers. The permanent magnets are driven into rotation by an electric motor that also drives rotary joints so that the heat transfer fluid pipe that runs through the fixed magnetocaloric material compartments is successively connected to the hot and cold circuits. This device, which therefore simulates the operation of a liquid ring, requires accurate, continuous and synchronous rotation of the various rotary joints and permanent magnets.

The movement, especially the linear drive or the rotational drive, of the magnets that generate the magnetic field, the variation of which, due to the linear or rotating movement, causes the temperature cycles of the magnetocaloric materials, requires driving means which usually consist of a traditional electric motor. It will be noted that traditional magnetocaloric materials tend to heat up almost instantaneously as they enter a magnetic field. So-called reverse magnetocaloric materials have the particularity of cooling down as they enter a magnetic field. The generation of calories or that of "negative" calories, so-called frigories, offers various benefits depending on the applications being considered.

The motor that drives the movement of the magnets has a certain size which adds to the overall dimensions of the device, increases its cost, weight and volume and reduces its efficiency, all of which represent disadvantages that impede the development of this technology, particularly when generating cold, despite the solution's undeniable ecological benefit.

U.S. publication 2005/0120720 A1 proposes a magnetocaloric generator in which the electric motorization is integrated and comprises coils wound around the poles of a stator, the rotor being free to rotate and made up of permanent magnets. In this embodiment, the magnetocaloric elements are arranged radially on each side of the poles. They are consequently away from the permanent magnets, are not subjected to the maximum magnetic flux and cannot produce their optimum thermal performances, which impedes the generator's global thermal efficiency. Moreover, the temperature of these magnetocaloric elements rises due to their proximity with the coils which leads to a detrimental effect of thermal remanence.

SUMMARY OF THE INVENTION

The present invention proposes to overcome these disadvantages by creating a thermal flux generating device with magnetocaloric material that is both economical and small in size, all the components of which are arranged so as to achieve an optimized construction in the smallest volume possible with the best possible energy efficiency.

This goal is achieved thanks to the device of the in which the magnetocaloric element is adjacent to the magnetic arrangement and positioned in the air gap formed by at least any one of a first space delimited between the magnetic arrangement and the armature and of a second space delimited between the magnetic arrangement and the external shell.

Depending on the configuration of the device according to the invention, the integration of one or more electric coils may be envisaged. To that effect, the device may comprise at least two electric coils.

This solution, thanks to direct control of each electric coil, ensures the movement of the magnetic arrangement and, especially when the magnetic field is produced by permanent magnets, cooperation with these permanent magnets to optimize the energy efficiency of the magnetocaloric material in the magnetic field thanks to these electric coils.

However, it is advisable to note that for efficiency purposes, the air gap between each coil and the mobile assembly that generates the magnetic field is advantageously as narrow as possible. And yet, if the magnetocaloric elements are placed in this air gap, its transverse dimension is inevitably increased, which may be detrimental to the system's efficiency in some critical cases.

That is why, according to a particular embodiment of the device, the magnetocaloric element is only positioned in the first space of the air gap.

According to another particular embodiment of the device, the magnetocaloric element is only positioned in the second space of the air gap adjacent to the first space.

According to yet another particular embodiment, the magnetocaloric element is advantageously positioned, in a continuous manner, in the first space and in the second space adjacent to the first one.

According to a specific embodiment, when the electric drive is a rotary motor, the device may advantageously comprise a fixed stator housed in the peripheral shell and a rotor mounted inside the shell, coaxially in relation to the fixed stator, with the rotor supporting the magnetic arrangement and the fixed stator comprising the electric coils, and the magnetocaloric elements form a continuous crown that surrounds the rotor and fully takes up the first space of the air gap between the rotor and the fixed stator.

According to another specific embodiment, when the electric drive is a rotary motor, the device may advantageously comprise a fixed stator housed in the peripheral shell and a rotor mounted inside the shell, coaxially in relation to the stator, with the rotor supporting the magnetic arrangement and the fixed stator comprising at least two electric coils which extend angularly over a first portion of the shell while leaving a second portion of the shell free from electric coils, and each magnetocaloric element is positioned in the second space of the air gap that corresponds to the second portion free from electric coils, the second space being adjacent to the first space that corresponds to the first portion of the shell.

According to another specific embodiment, when the electric drive is a rotary motor, the device may comprise a fixed stator housed in the peripheral shell and a rotor mounted inside the shell, coaxially in relation to the fixed stator, with the rotor supporting the magnetic arrangement and the fixed stator comprising at least two electric coils that extend angularly over a first portion of the shell while leaving a second portion of the shell free from electric coils, and in that the magnetocaloric element is positioned both in the first space that corresponds to the first portion of the shell and in the second space adjacent to the first space and which corresponds to the second portion free from electric coils.

According to another specific embodiment, when the electric drive is a linear motor, the device may comprise an elongated shell, a fixed linear stator housed in the shell and a carriage that moves linearly, alternately in relation to the fixed stator, with the mobile carriage supporting the magnetic arrangement and the fixed stator comprising the electric coils, and the magnetocaloric elements form at least one continuous row lined up along the fixed linear stator and fully taking up the first space of the air gap between the mobile carriage and the linear stator.

According to another specific embodiment, when the electric drive is a linear motor, the device may comprise an elongated shell, a fixed linear stator housed in the shell, comprising at least one electric coil and extending over a first portion of the length of this shell while leaving a second portion of the shell free from electric coils, a carriage that moves linearly, alternately in relation to the fixed stator and supporting each magnetic arrangement, and each magnetocaloric element is positioned in the second space of the air gap that corresponds to the second portion of the shell, this second space being adjacent to the first space that corresponds to the first part of the shell.

According to another specific embodiment, when the electric drive is a linear motor, the device may comprise an elongated shell, a fixed linear stator housed in the shell, comprising at least one electric coil and extending over a first portion of the length of this shell while leaving a second portion of the shell free from electric coils, a carriage that moves linearly, alternately in relation to the fixed stator and supporting the magnetic arrangement, and the magnetocaloric element is positioned both in the first space of the air gap that corresponds to the first portion of the shell and in the second space adjacent to the first space and which corresponds to the second portion of the shell free from electric coils.

Advantageously, the magnetic arrangement comprises a set of permanent magnets to generate the magnetic field.

In order to concentrate the magnetic field generated, the permanent magnets comprise at least one magnetically permeable element.

According to a particular embodiment, the stator preferentially comprises a set of electric coils, each one with an axis positioned according to a roughly radial direction.

According to a particular form of construction, the fixed linear stator may comprise a set of electric coils with axes that are parallel and roughly perpendicular to the moving direction of the mobile carriage.

In order to impose a preferred direction of rotation to the rotor, the set of electric coils may show a geometrical dissymmetry in relation to the flux lines generated by the magnetic arrangement.

In order to impose a preferred direction of linear movement to the mobile carriage, the set of electric coils may show a geometrical dissymmetry in relation to the flux lines generated by the magnetic arrangement.

The device may be supplemented by means that control the electric coils, these means including at least one electronic circuit arranged so as to sequentially switch these coils.

BRIEF DESCRIPTION OF THE DRAWINGS

The present invention and its advantages will be better revealed in the following description of several embodiments given as non limiting examples, in reference to the drawings in appendix, in which:

FIGS. 8A, 8B and 8C represent a second embodiment of the device of the invention in which the motor is linear, FIGS. 10A and 10B represent another embodiment variant of the device of the invention, in which the motor is linear, in two successive positions, FIGS. 11A and 11B represent another embodiment variant of the device of the invention, in which the motor is linear, in two successive positions.

DETAILED DESCRIPTION OF THE PREFERRED EMBODIMENTS

Figure 1:
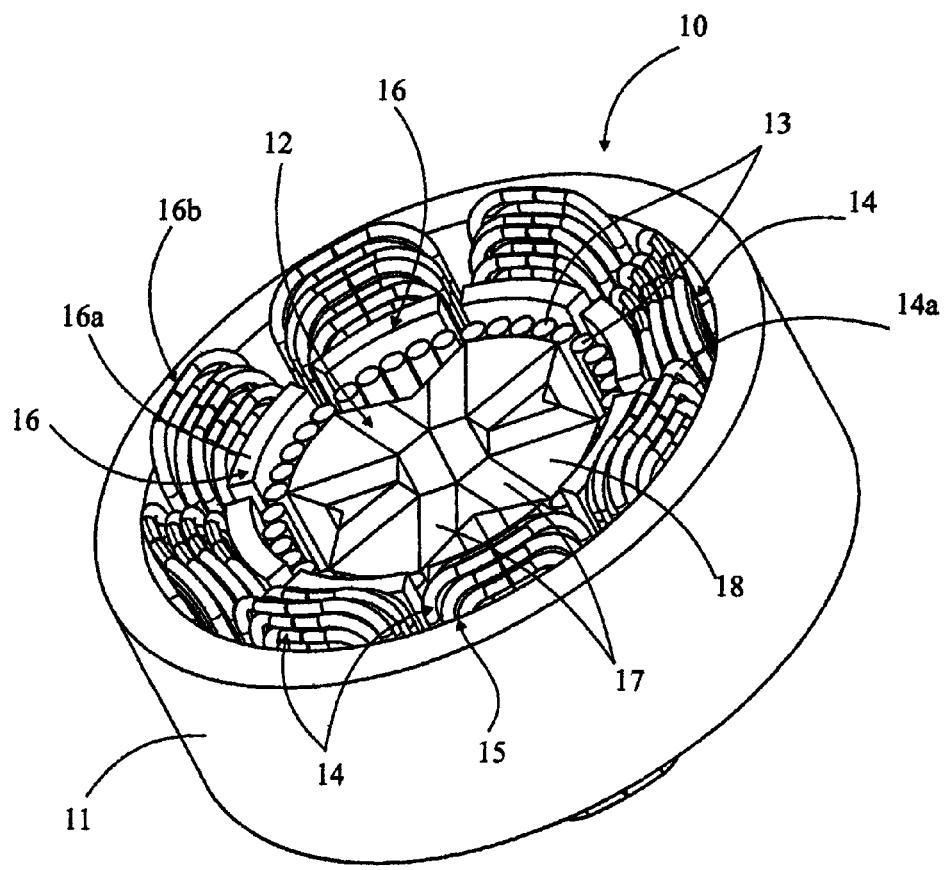
FIG. 1 is a perspective view of a first embodiment of the device of the invention.
Figure 2:
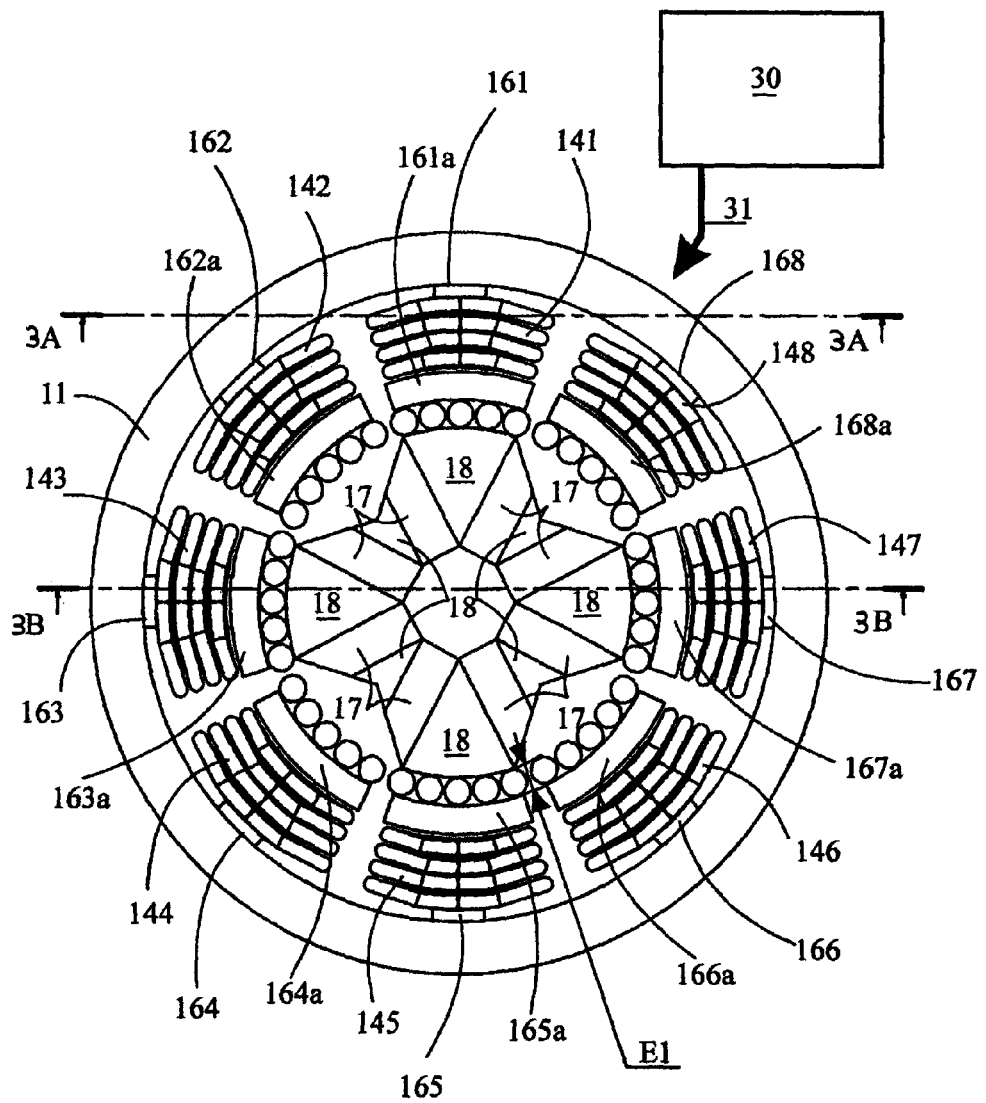
FIG. 2 is a plane view of the device from FIG. 1, FIGS. 3A and 3B are section views, along lines 3A-3A and 3B-3B respectively, of FIG. 2.

In reference to FIGS. 1 to 3, the device 10 represented, which corresponds to a particular embodiment variant with a roughly cylindrical geometry, comprises an external cylindrical shell 11, made out of metal or any other adequate material, which delimits the inside space of device 10. Inside this shell 11 are mounted a rotor 12 which consists of a rotary magnetic arrangement described in more detail hereafter, at least one thermal element made up in this case of a roughly circular ring of elements 13 comprising at least one magnetocaloric material, this ring being positioned coaxially around the rotor 12 and a set of electric coils 14, with radial axes, arranged evenly around the rotor 12 and making up a stator 15. The magnetocaloric elements 13 are adjacent to the magnetic arrangement and positioned in the circular air gap that separates the rotor 12 from the stator 15, and which corresponds to a first space E1, in order to take advantage of the maximum magnetic flux.

The rotary magnetic arrangement of the rotor 12 as it is represented comprises several permanent magnets 17, in this case eight, separated by elements 18 made out of soft iron or similar, in this case also eight, which are inserted between the permanent magnets 17 and some of which may form magnetic flux concentrators. The unit is assembled following a radial geometry, the permanent magnets 17 all having the same shape, and the elements 18 made out of soft iron or similar, such as an iron-cobalt alloy (FeCo) or an iron-silicon alloy (FeSi), formed of sheet metal stacking for example, having the same geometrical shape in twos and being evenly inserted between the permanent magnets 17. This arrangement is not constraining and it is possible to modify the shape as well as the number and position of the components of the magnetic arrangement. The objective of this magnetic arrangement is to achieve the most intense magnetic field possible, within a relatively limited space and at the lowest manufacturing cost possible. The magnetic field generates field lines that run through the magnetocaloric elements 13 and it varies according to the rotation of the rotor 12, so as to generate, in a known manner, thermal variations within the magnetocaloric elements 13. The magnetocaloric elements 13 are schematically represented as cylindrical bars, but their shape and structure may be different. The magnetocaloric material(s) used may for example be made up of a porous structure, of structured elements, of a peripheral coating of tubular parts or similar. It is essential that the contact surface of the magnetocaloric elements 13 with a heat transfer fluid intended to collect the calories and/or frigories emitted is as large as possible so that the heat exchange can take place under the best possible conditions with the greatest efficiency.

In the known thermal flux generating devices with magnetocaloric effect of this type, the rotor 12 is driven by an independent, external electric motor coupled with the rotor. In the present embodiment, the movement or motorized drive is generated by means of available components, by using the existing permanent magnets 17 and by associating them with, as in the illustrated variant for example, eight electric coils 14 each including an electric winding 14a each mounted on an armature 16. Each armature 16 is roughly shaped as a T and includes a base part 16a in the shape of a circular sector and a branch 16b, perpendicular in relation to base part 16a. These armatures 16 may be made out of one of the materials chosen in the group that includes soft iron, an iron-cobalt alloy (FeCo) and an iron-silicon alloy (FeSi). The interaction of the electromagnetic field created by the selectively fed electric coils 14 generates a torque on the permanent magnets 17, which produces the movement, in this case the rotation of the rotor 12. Consequently, the addition of the electric coils 14 allows the drive function of the rotor 12 to be combined with the basic function of the thermal flux generating device with magnetocaloric material 10, which consists in creating alternate variations of the magnetic field so as to cause temperature fluctuations within the magnetocaloric elements 13.

As shown in FIG. 2, in the represented example with eight electric coils 141, 142, 143, 144, 145, 146, 147, and 148, means to control the electric coils are used, for example an electronic circuit 30, schematically represented, and connecting elements 31. The electric coils are fed sequentially so as to firstly create positive magnetic poles (+) at the base parts 161a and 165a of the armatures 161 and 165, which respectively correspond to the electric coils 141 and 145, and negative magnetic poles (−) at the base parts 163a and 167a of the armatures 163 and 167, which respectively correspond to the electric coils 143 and 147. Secondly, the supply of the coils is offset so as to create positive magnetic poles (+) at the base parts 162a and 166a of the armatures 162 and 166, which respectively correspond to the electric coils 142 and 146, and negative magnetic poles (−) at the base parts 164a and 168a of the armatures 164 and 168, which respectively correspond to the electric coils 144 and 148. This process allows the creation of the rotating field required to drive the rotor 12. Advantageously, a slight dissymmetry in the radial positioning of the coils will allow a preferred direction of rotation to be initiated.

Figure 3A:
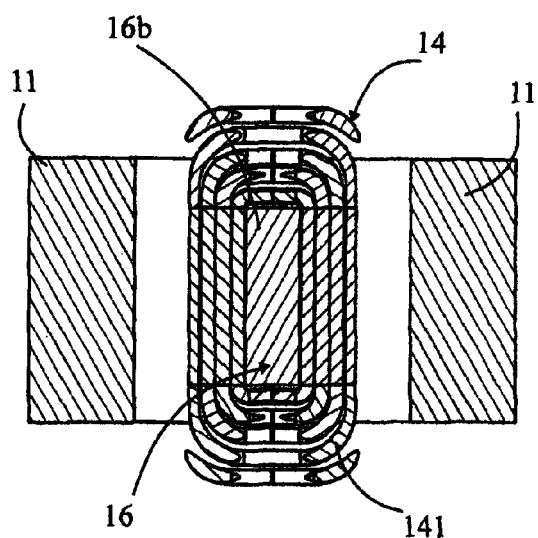
Figure 3B:
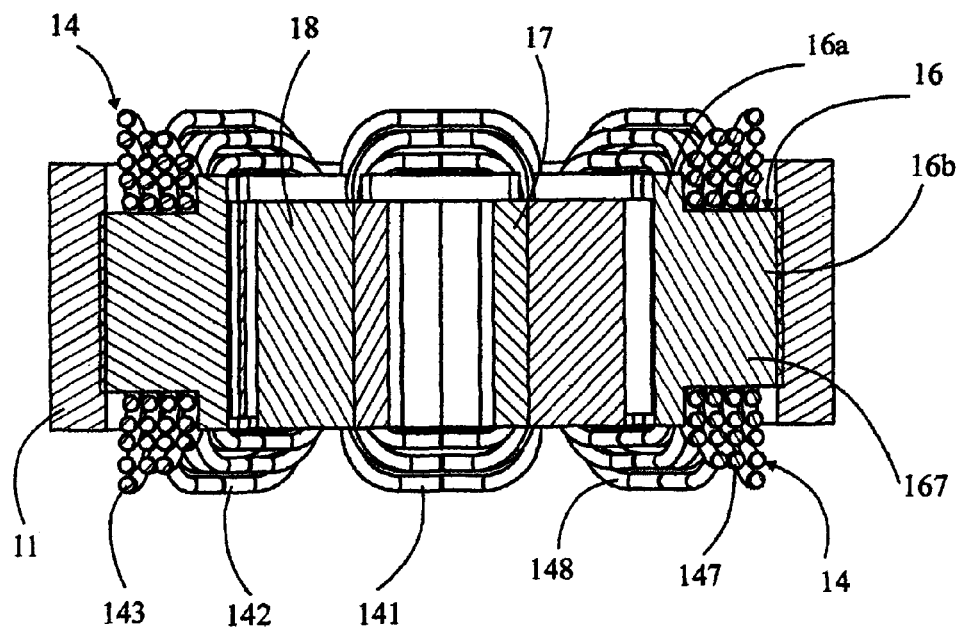

FIGS. 3A and 3B respectively represent section views of the device from FIGS. 1 and 2 along lines 3A-3A and 3B-3B, illustrating the position of the windings of the electric coils 14 and of the components of the armature 16, especially the branch 16b positioned radially.

Figure 4:
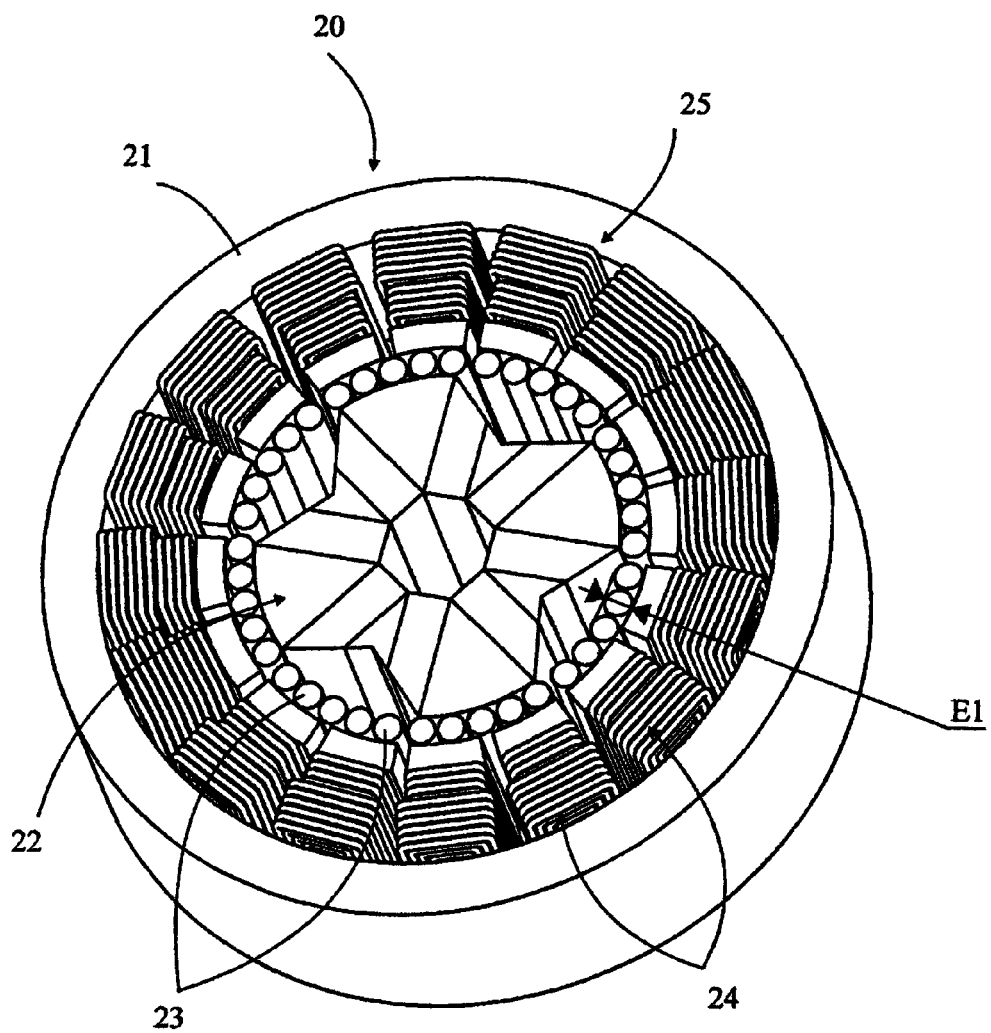
FIG. 4 is a perspective view of a second embodiment of the device of the invention.

FIG. 4 is a view similar to that of FIG. 1 representing a construction in which the device 20 is equipped with sixteen electric coils 24 housed inside a cylindrical shell 21 and which make up the stator 25. The motorized drive is similar to the previous one and the rotor 22 which consists of a rotary magnetic arrangement is roughly identical to the rotor 12. The same goes with the crown of magnetocaloric elements 23 which is adjacent to the magnetic arrangement and positioned in the air gap that separates the rotor 22 from the stator 25 and which corresponds to the first space E1. Increasing the number of electric coils allows a more gradual control over the rotating field and better control over the rotational drive of the rotor 22.

Figure 5:
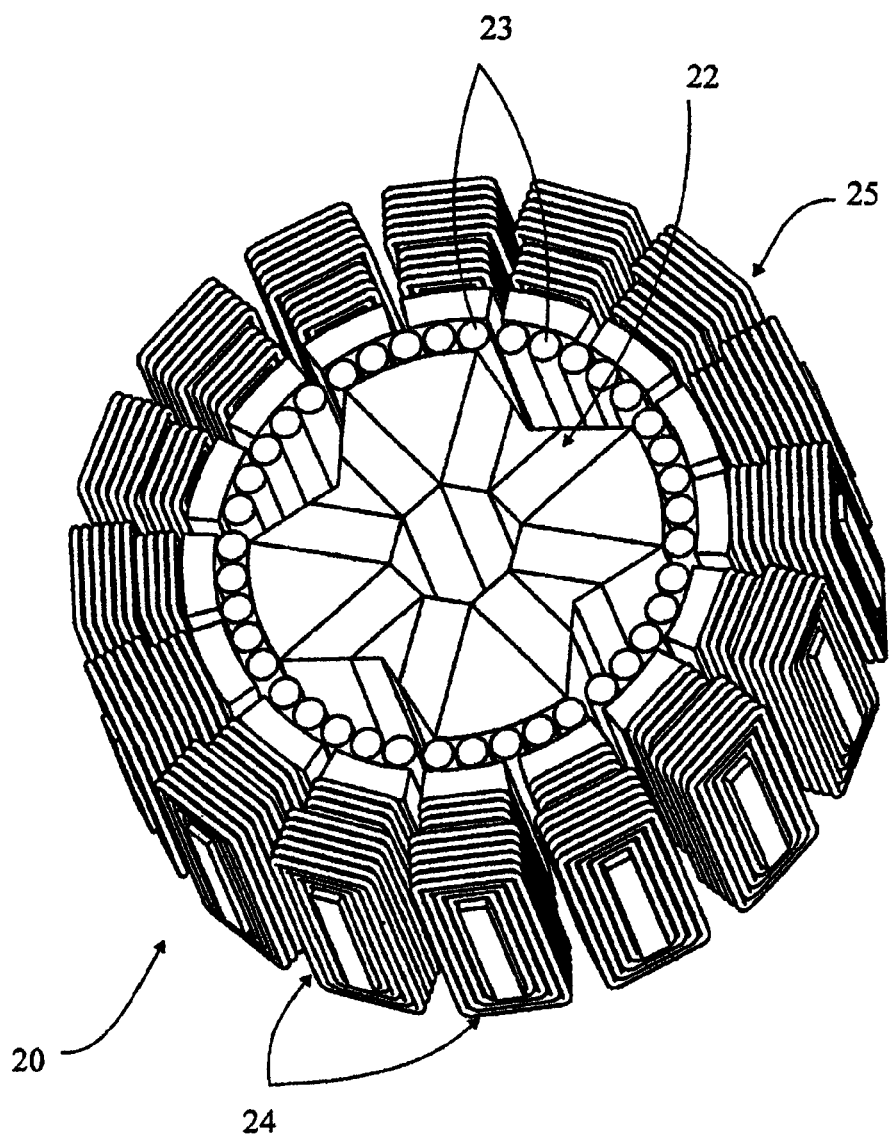
FIG. 5 is a partial perspective view of the device from FIG. 4.

FIG. 5 is a view similar to that of FIG. 4, but the peripheral cylindrical shell 21 has been removed.

Figure 6:
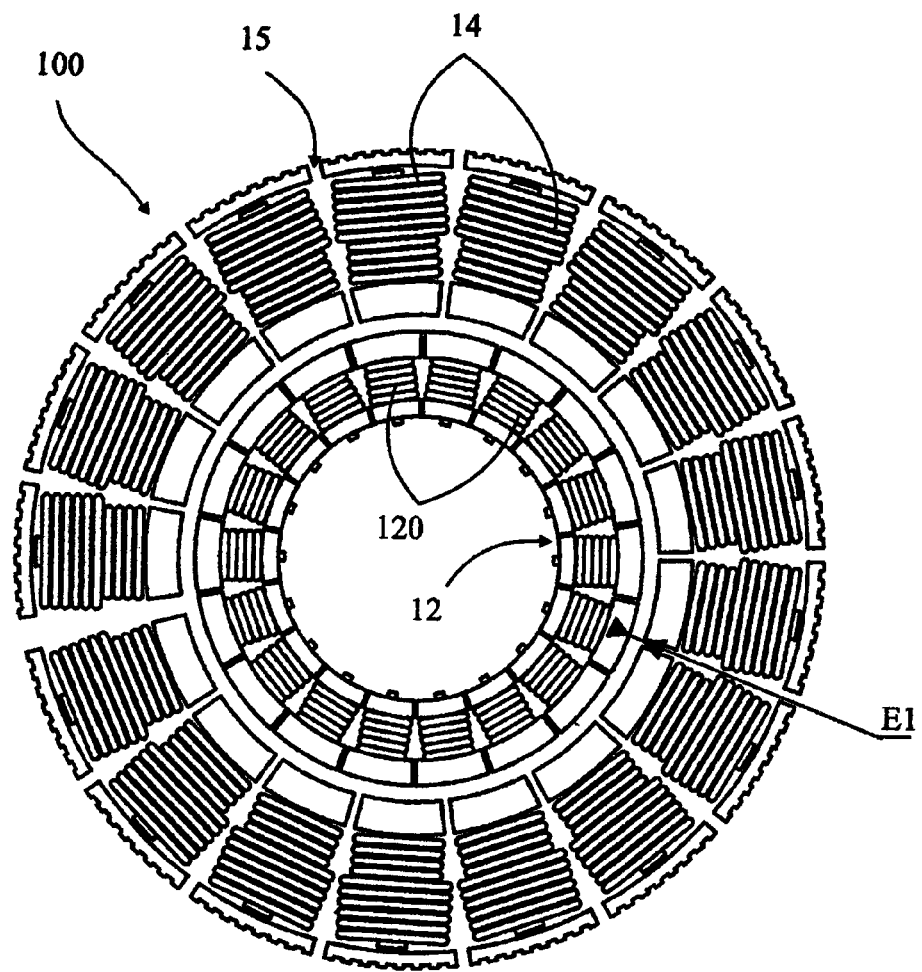
FIG. 6 is a plane view of an embodiment variant of the device of the invention.

FIG. 6 represents another embodiment where the shell has been removed, which differs from that of FIG. 2, mainly in that the permanent magnets 17 of the magnetic arrangement are replaced by electromagnets 120 fitted on the rotor 12. In this case, the device 100 comprises a set of seventeen electric coils 14, with radial axes, evenly positioned around the rotor 12 and which make up a stator 15. There are eighteen electromagnets 120 in this case, so that the electric coils 14 show a geometrical dissymmetry in relation to the electromagnets 120, in this case an axial shift of a few degrees in relation to the corresponding electric coils 14 to impose a preferred direction of rotation to the rotor. In this variant, the magnetocaloric elements (not represented) may form a crown adjacent to the magnetic arrangement and positioned in the air gap that separates the rotor 12 from the stator 15 and which corresponds to the first space E1.

Figures 7A, 7B, 7C:
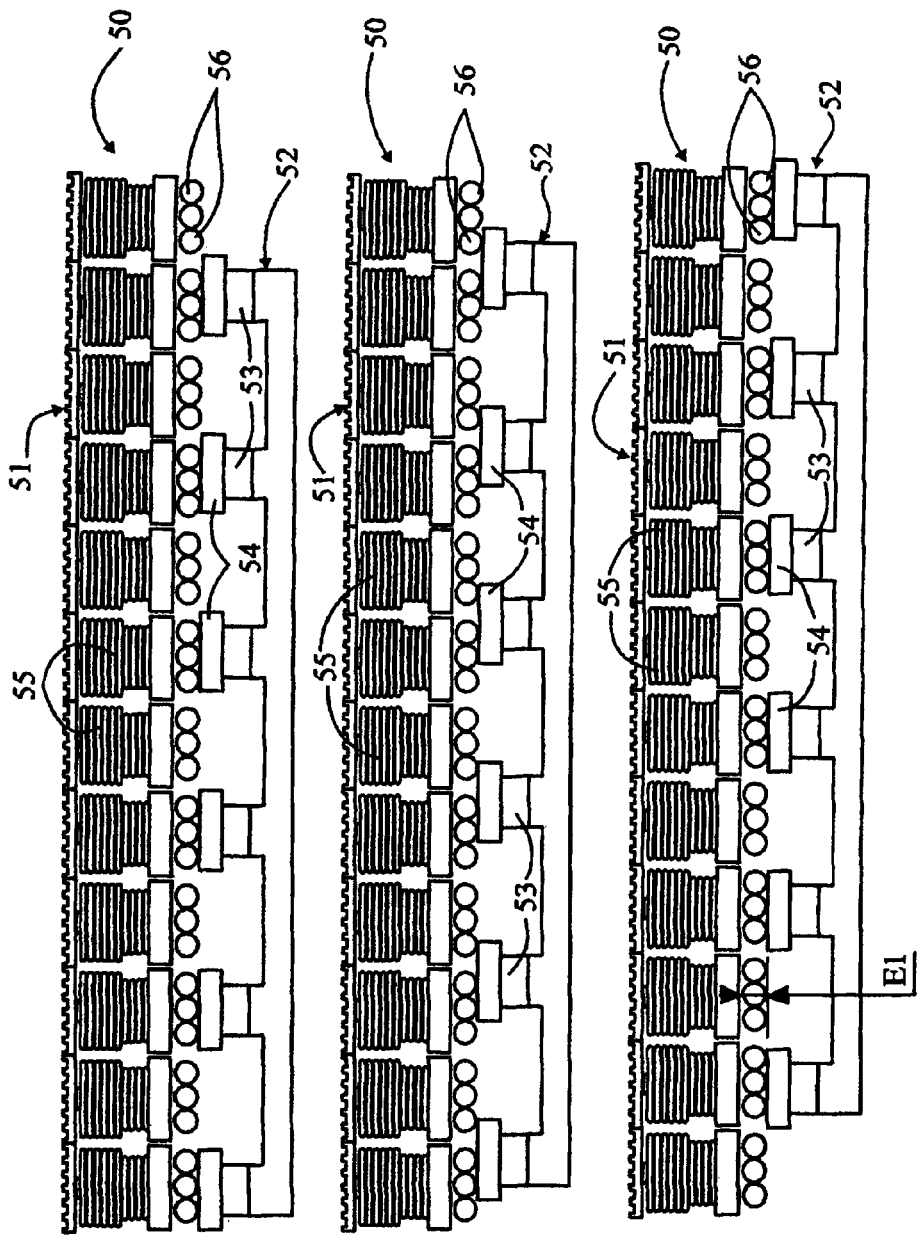
FIGS. 7A, 7B and 7C represent a first embodiment of the device of the invention in which the motor is of the linear type.

FIGS. 7A, 7B and 7C correspond to a first embodiment of the device of the invention, in which the drive of the magnetic arrangement is achieved via linear movement. The device 50 comprises an elongated shell (not represented), a fixed linear stator 51 and a carriage 52 that moves alternately in relation to the fixed linear stator 51 and which supports the magnetic arrangement, made up in this case of a series of permanent magnets 53, each associated with a magnetically permeable element 54. The fixed linear stator 51 consists of a set of electric coils 55 with parallel axes and perpendicular to the moving direction of the carriage 52. A series of magnetocaloric elements 56 is lined up to form a row adjacent to the magnetic arrangement and positioned in the air gap between the fixed linear stator 51 and the magnetic arrangement supported by the carriage 52, or more exactly the line of the magnetically permeable elements 54, and which corresponds to the first space E1.

The three FIGS. 7A, 7B and 7C correspond to three successive positions of the linearly mobile carriage 52 during its movement. The field lines that run through the electric coils 55 and permanent magnets 53 depending on the supply of the coils cause the linear movement of the carriage 52.

The FIGS. 8A, 8B and 8C represent views similar to those of the previous FIGS. 7A, 7B and 7C. As previously, the device 60 comprises an elongated shell (not represented), a fixed linear stator 61 and a carriage 62 that moves alternately in relation to the fixed linear stator 61 and which supports the magnetic arrangement, made up in this case of a series of electromagnets 63, each associated with a magnetically permeable element 64. The fixed linear stator 61 comprises a set of electric coils 65 with parallel axes and perpendicular to the moving direction of the carriage 62. A series of magnetocaloric elements 66 is lined up to form a row adjacent to the magnetic arrangement and positioned in the air gap between the fixed linear stator 61 and the magnetic arrangement supported by the carriage 62, and which corresponds to the first space E1.

The three FIGS. 8A, 8B and 7C correspond to three successive positions of the carriage 62 that moves linearly during its movement. The operating mode of the device 60 is identical to that of the previous device 50 from FIGS. 7A, 7B and 7C.

Figure 9:
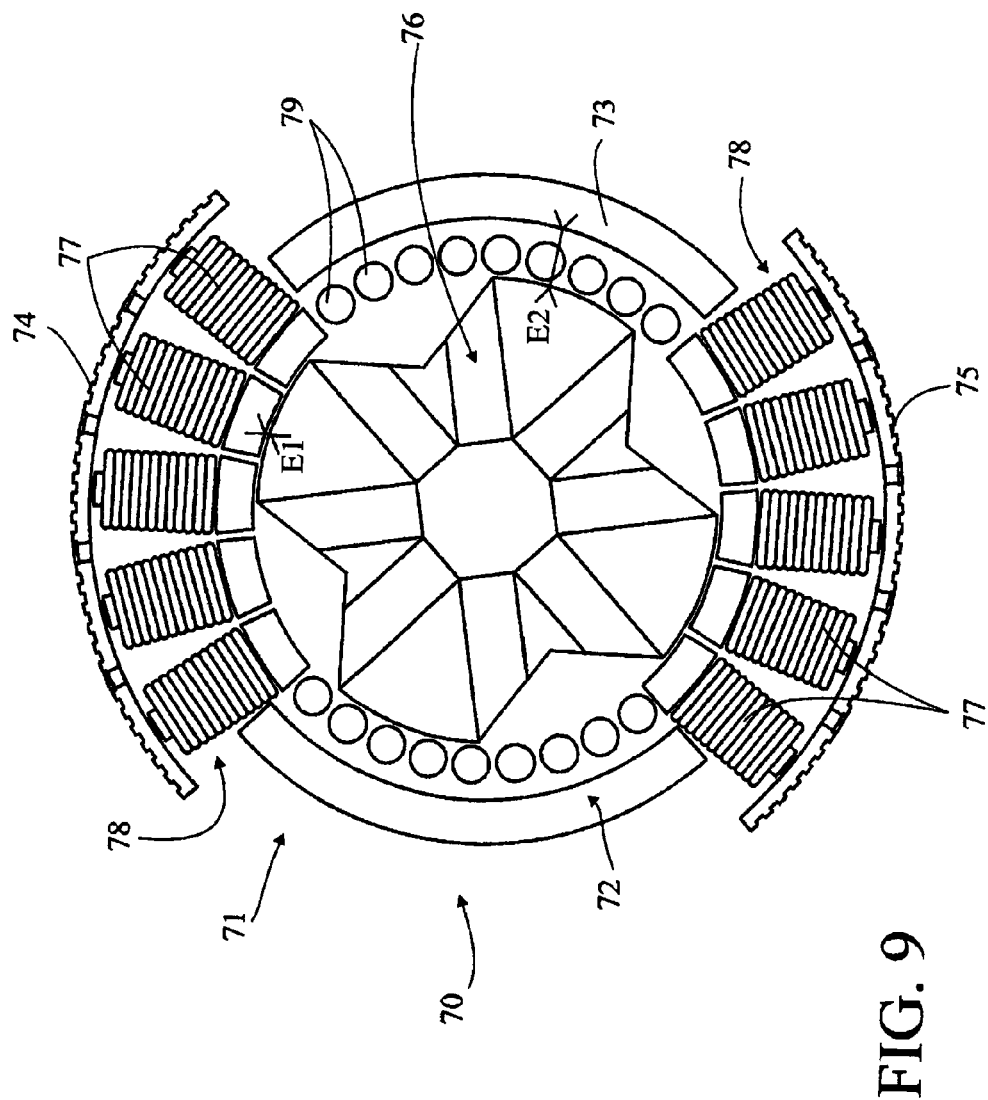
FIG. 9 represents an embodiment variant of the device according to the invention, in which the motor is rotary.

The device 70 from FIG. 9 corresponds to an embodiment variant similar to that from FIGS. 1 to 5. It comprises an external shell 71 made up of two first cylindrical segments 72 and 73. This shell 71 is supplemented by two second cylindrical segments 74 and 75 with a diameter greater than that of the first segments 72 and 73. Inside this shell 71, and more especially inside the first two cylindrical segments 72 and 73, a rotor 76 is mounted which consists of a rotary magnetic arrangement similar to that from FIGS. 1 to 5. It will be noted that in the example represented, the angular sector over which the first two cylindrical segments 72 and 73 extend is approximately 90 to 120°, these values being non-limiting and able to vary depending on the positioning of the electric coils 77 and magnetocaloric elements 79. The second cylindrical segments 74 and 75 are used to support the electric coils 77, ten of them, symmetrically distributed in relation to the central axis of the rotor 76 and which make up a stator 78. The number of these electric coils 77 may vary, though two is the minimum. The rotor 76 is led into rotation by an offset supply of the diametrically opposite electric coils 77.

It is noted that, in this embodiment, the first space E1 that separates the rotor 76 from the stator 78 makes up a very narrow air gap. By contrast, the second space E2 that separates the first cylindrical segments 72 and 73 from the shell 71 of the rotor 76 makes up an air gap that is sufficiently wide to house the thermal element, made up of two annular segments of magnetocaloric elements 79 in this case. These magnetocaloric elements 79 are, as in the previous examples, adjacent to the magnetic arrangement so as to take advantage of the maximum magnetic flux. These magnetocaloric elements 79 are divided into two groups, arranged symmetrically around the rotor 76, in relation to the central axis of the latter. This embodiment allows the rotation of the rotor 76 with a minimum of energy given the very small first space E1 of the air gap with the stator 78, though without penalizing the thermal efficiency of the device 70 which is ensured by the magnetocaloric elements 79 in sufficient quantity.

The device 80 from FIGS. 10A and 10B is the derivative of the device 70 above applied to a linear motor, the embodiment of which is similar to that from FIGS. 7A-C. It comprises an external shell 81 made up of a first linear segment 82, supplemented by a second linear segment 83 located at a level different from the first segment 82. In parallel to this shell 81, a carriage 84 is mounted which consists of a linear magnetic arrangement similar to that from FIGS. 7A-C. It will be noted that in the example represented, the first linear segment 82 extends over approximately ⅛th of the overall length of the shell 81, this value being non-limiting and able to vary depending on the positioning of the electric coils 85 and magnetocaloric elements 87. The same goes with regards to the number of electric coils 85 which may also vary and be limited to one coil for example. In this device 80, the second linear segment 83 is used to support electric coils 85, two of them, arranged side by side and which make up a stator 86. FIGS. 10A and 10B illustrate the two extreme positions of the mobile carriage 84, the linear movement of which is caused by an alternate supply of the electric coils 85.

It is noted that, in this embodiment, the first space E1 that separates the mobile carriage 84 from the stator 86 makes up a very narrow air gap. By contrast, the second space E2 that separates the first linear segment 82 from the mobile carriage 84 makes up an air gap that is sufficiently wide to house the thermal element, made up of a row of magnetocaloric elements 87 in this case. These magnetocaloric elements 87 are, as in the previous examples, adjacent to the magnetic arrangement so as to take advantage of the maximum magnetic flux. This embodiment allows the linear movement of the mobile carriage 84 with a minimum of energy given the very small first space E1 of the air gap with the stator 86, though without reducing the thermal efficiency of the device 80 which is ensured by the magnetocaloric elements 87 in sufficient quantity.

The device 300 from FIGS. 11A and 11B represents an embodiment variant of the device represented on FIGS. 10A and 10B. The device 300 represented indeed only comprises one electric coil 305 which actuates the carriage 304 so as to ensure a linear movement of the latter. The carriage supports the magnetic arrangement made up of permanent magnets. Two permanent magnets 309' and 309 among all of the permanent magnets that form the magnetic arrangement are arranged side by side and intended to cooperate with a single electric coil 305 so as to ensure the movement of the carriage 304. They each comprise an opposite magnetization so that depending on the supply of the electric coil 305 and the magnetic pole created at the base part 307, each one of the two permanent magnets 309', 309 is either repelled or attracted, thus creating the sequential movement of the carriage 304. To that end, FIG. 11A represents the first extreme position of the carriage 304 in which the base part 307 has a negative magnetic pole (−) and the permanent magnet 309' located to the left of the figure and with a positive magnetic pole (+) is positioned at the latter and FIG. 11B represents the second extreme position of the carriage 304 in which the base part 307 has a positive magnetic pole (+) and the permanent magnet 309 located to the right of the figure and with a negative magnetic pole (−) is at the latter. In this embodiment variant, one also notes a very narrow first space E1 of the air gap which separates the mobile carriage 304 from the stator 306 and a second space E2 of the air gap that is sufficiently wide to house the thermal element which, in this variant, is also made up of a row of magnetocaloric elements 308 and one achieves the same advantages as those indicated for the device from FIGS. 10A and 10B, since the magnetocaloric elements 308 are, as in the previous examples, adjacent to the magnetic arrangement so as to take advantage of the maximum magnetic flux.

Figure 12:
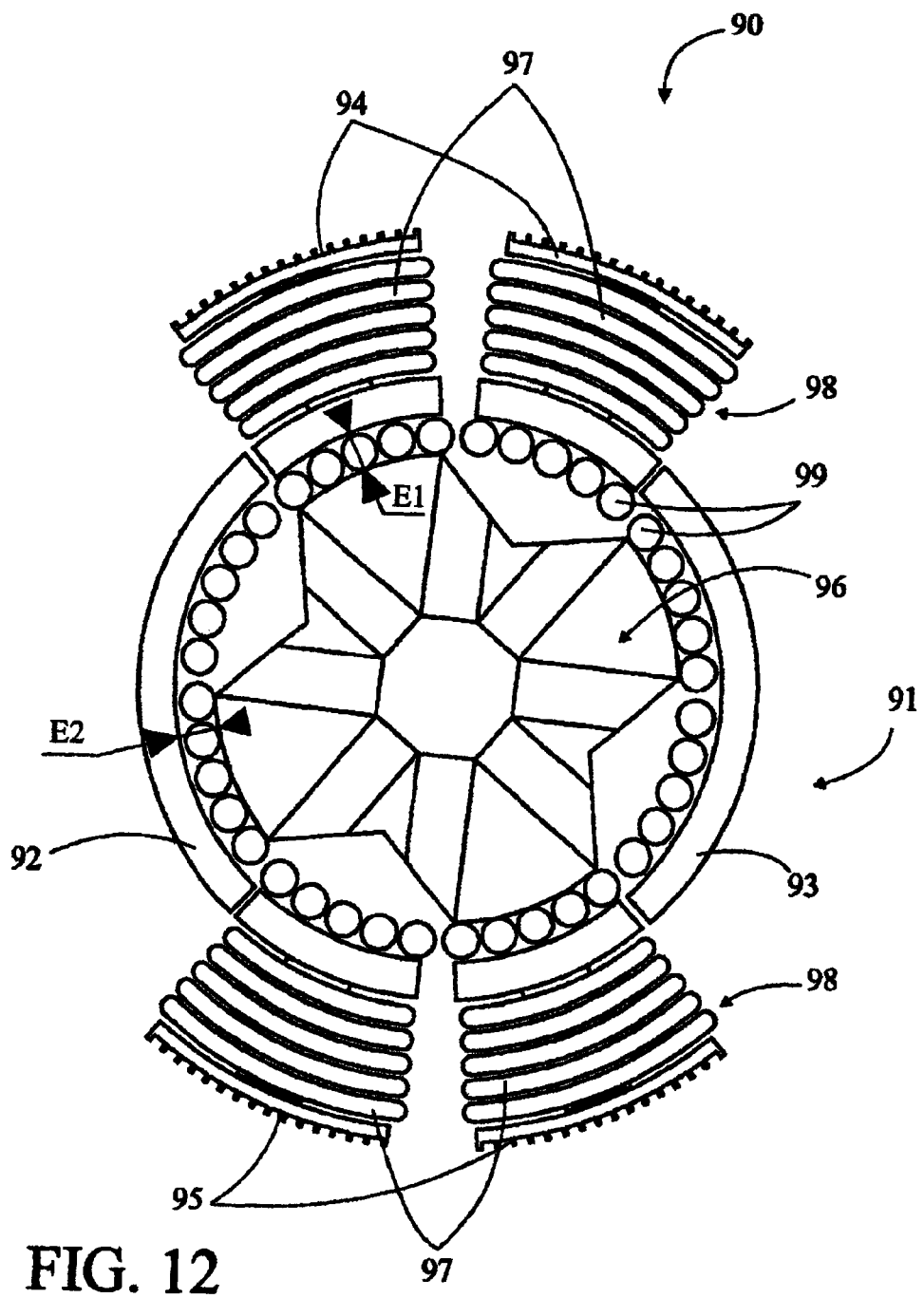
FIG. 12 represents another embodiment variant of the device of the invention, in which the motor is rotary.

The device 90 from FIG. 12 corresponds to an embodiment variant similar to that from FIG. 9 in which the magnetocaloric elements 99 remain adjacent to the magnetic arrangement, and positioned both in the areas free from coils, which correspond to the second space E2 of the air gap, and in the first space E1 of the air gap between the rotor 96 and the stator 91. This device also comprises an external or peripheral shell 91, made up of two first cylindrical segments 92 and 93. This shell 91 is supplemented by two second cylindrical segments 94 and 95 with a diameter greater than that of the first segments 92 and 93. The rotor 96 is mounted inside the first two cylindrical segments 92 and 93, and consists of a rotary magnetic arrangement similar to that from FIGS. 1 to 5. Here also, the angular sector over which the first two cylindrical segments 92 and 93 extend may vary depending on the positioning of the electric coils 97 and magnetocaloric elements 99. The second cylindrical segments 94 and 95 are used to support electric coils 97, four of them, and which make up a stator 98. The number of these electric coils 97 may vary, though two is preferably the minimum. The rotor 96 is led into rotation by an offset supply of the diametrically opposite electric coils 97.

Figure 13:
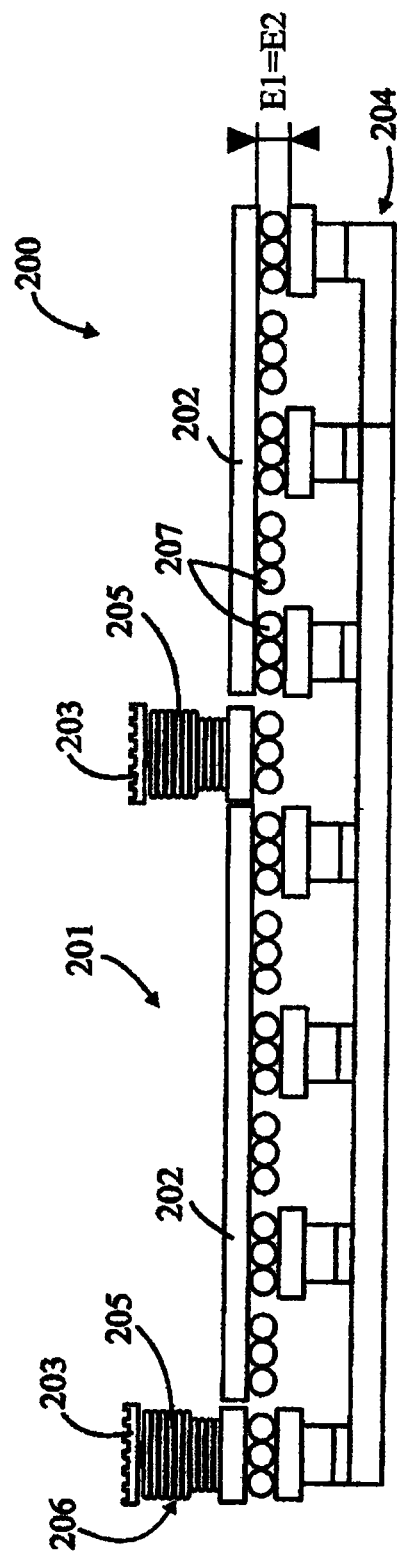
FIG. 13 represents another embodiment variant of the device of the invention, in which the motor is linear.

The device 200 from FIG. 13 is the derivative of the device 90 applied to a linear motor, the embodiment of which is similar to that from FIGS. 10A and 10B in which the magnetocaloric elements 207 remain adjacent to the magnetic arrangement, and positioned both in the areas free from coils, which correspond to the second space E2 of the air gap, and in the first space E1 of the air gap between the carriage 204 and the stator 206. It comprises an external shell 201 made up of a first linear segment 202, supplemented by a second linear segment 203 located at a level different from the first segment 202. A carriage 204 consisting of a linear magnetic arrangement similar to that from FIGS. 7A-C is mounted in parallel to this shell 201. It will be noted that in the example represented, the first linear segment 202 extends over two areas of the entire length of the shell 201, this configuration being non-limiting and able to vary depending on the positioning of the electric coils 205. The same goes with regards to the number of electric coils which may also vary and be limited to one coil for example. In this device 200, the second linear segment 203 is also used to support electric coils 205, two of them, arranged apart from one another and which make up a stator 206.

POSSIBILITIES FOR INDUSTRIAL APPLICATION

The present invention is not limited to the examples of embodiments described but extends to any obvious modification and variation for a person skilled in the art without departing from the scope of protection, as defined by the annexed claims. The number of magnets that make up the magnetic arrangement, together with their shape and positioning, may be modified depending on the objectives being sought in terms of efficiency, size, speed of rotation of the rotor, etc. The number of electric coils as well as their positioning may also vary depending on the objectives to be achieved. The nature of the materials, especially of the magnetocaloric materials, that of the magnetically permeable elements and that of the other components such as the shell for the device may be modified according to the requirements.

The invention claimed is:
1. A thermal flux generating device with magnetocaloric material (10, 20, 100, 50, 60) comprising:
at least one thermal flux generating unit housed in an external shell (11, 21, 91, 201) and equipped with at least one thermal element containing at least one magnetocaloric element;
at least one magnetic arrangement arranged so as to generate a magnetic field;
at least one electric drive arranged so as to facilitate relative movement of the magnetic arrangement in relation to each of the at least one magnetocaloric element (13, 23, 56, 66, 99, 207) to subject each of the at least one magnetocaloric element to a variation in magnetic field and to cause a temperature of the magnetocaloric element to vary;
means for collecting at least one of calories and frigories emitted by each of the at least one magnetocaloric element due to the variation in the magnetic field;
the electric drive being integrated into the thermal flux generating device with magnetocaloric material (10, 20, 100, 50, 60, 90, 200) and comprising at least one electric coil (14, 24, 55, 65, 97, 205) equipped with a winding supported by an armature (16) and supplied with electric current so as to generate the variation in the magnetic field which causes the movement of a mobile assembly (12, 22, 52, 62, 96, 204) that supports the magnetic arrangement;
the at least one magnetocaloric element (13, 23, 56, 66, 99, 207) being located directly adjacent to the magnetic arrangement and positioned in an air gap formed by at least a first space (E1) delimited radially between the magnetic arrangement and the armature (16) of the electric coils.

2. The device according to claim 1, further comprising at least two electric coils (14, 24, 55, 65, 97, 205).

3. The device according to claim 1, wherein the magnetocaloric element is positioned, in a continuous manner, in the first space (E1) and a second space (E2) adjacent to the first space, and the second space (E2) is delimited between the magnetic arrangement and the external shell (91, 201).

4. The device according to claim 2, wherein the electric drive is a rotary motor which comprises a fixed stator (15, 25) housed in the external shell (11, 21) and a rotor (12, 22) mounted inside the external shell, coaxially in relation to the fixed stator, and the rotor supports the magnetic arrangement and the fixed stator comprises the electric coils (14, 24), and the magnetocaloric elements (13, 23) form a continuous crown that surrounds the rotor (12, 22) and substantially fully takes up the first space (E1) of the air gap formed between the fixed stator and the rotor.

5. The device according to claim 3, wherein the electric drive is a rotary motor which comprises a fixed stator (98) housed in the external shell (91) and a rotor (96) mounted inside the external shell, coaxially in relation to the fixed stator, and the rotor supports the magnetic arrangement and the fixed stator comprises at least two electric coils (97) that extend angularly over a first portion of the external shell while leaving a second portion of the external shell free from the electric coils (97), and the magnetocaloric element (99) is positioned both in the first space (E1) that corresponds to the first portion of the shell and in the second space (E2), adjacent to the first space, which corresponds to the second portion of the external shell free from the electric coils (97).

6. The device according to claim 2, wherein the electric drive is a linear motor which comprises an elongated shell, a fixed linear stator (51, 61) housed in the elongated shell and a mobile carriage (52, 62) that moves linearly, alternately in relation to the fixed stator, the mobile carriage supporting the magnetic arrangement and the fixed stator comprising the electric coils (55, 65), and the magnetocaloric elements (56, 66) form at least one continuous row lined up along the fixed linear stator (51, 61) and substantially fully taking up the first space (E1) of the air gap between the linear stator and the mobile carriage.

7. The device according to claim 3, wherein the electric drive is a linear motor which comprises an elongated shell (201), a fixed linear stator (206) housed in the shell comprises the at least one electric coil (205) which extends over a first portion of a length of the shell while leaving a second portion of the length of the shell free from the electric coils, a carriage (204) that moves linearly, alternately in relation to the fixed stator and supporting the magnetic arrangement, and the magnetocaloric element is positioned both in the first space (E1) of the air gap that corresponds to the first portion of the length of the shell and in the second space (E2), adjacent to the first space, and which corresponds to the second portion of the shell free from electric coils.

8. The device according to claim 1, wherein the magnetic arrangement comprises a set of permanent magnets (17, 53).

9. The device according to claim 8, wherein the permanent magnets (17, 53) of the magnetic arrangement of the rotor comprise at least one magnetically permeable element (18, 54).

10. The device according to claim 4, wherein the electric coils (14, 24, 97) each have an axis which substantially extends a radial direction of the device.

11. The device according to claim 6, wherein each of the electric coils (55, 65, 205) has an axis that is parallel and substantially perpendicular to the moving direction of the mobile carriage (52, 62, 204).

12. The device according to claim 4, wherein the electric coils (14, 24) show a geometrical dissymmetry in relation to flux lines generated by the magnetic arrangement to impose either a preferred direction of rotation to the rotor (12, 22) or a preferred direction of linear movement to a mobile carriage (52, 62).

13. A thermal flux generating device comprising a magnetocaloric material, the thermal flux generating device comprising:
- at least one thermal flux generating unit housed within an external shell and equipped with at least one thermal element containing at least one magnetocaloric element;
- at least one magnetic arrangement arranged centrally within the housing for generating a magnetic field;
- at least one electric drive arranged so as to facilitate movement of the magnetic arrangement relative to the at least one magnetocaloric element so as to subject the at least one magnetocaloric element to a variation in magnetic field and vary a temperature of the magnetocaloric element;
- a mechanism for collecting at least one of calories and frigories emitted by the at least one magnetocaloric element due to the variation in the magnetic field;
- the electric drive being integrated into the thermal flux generating device with the magnetocaloric material and comprising at least one electric coil equipped with a winding supported by an armature and supplied with electric current so as to generate the variation in the magnetic field which causes the movement of a mobile assembly that supports the magnetic arrangement;
- the at least one magnetocaloric element being located in an air gap formed between the magnetic arrangement and the armature of the electric coils such that the at least one magnetocaloric element being directly adjacent to the magnetic arrangement so as to be subjected to a maximum magnetic flux.

14. A thermal flux generating device comprising a magnetocaloric material, the thermal flux generating device comprising:
- at least one thermal flux generating unit housed within a stator of an external shell and equipped with at least one thermal element containing at least one magnetocaloric element;
- at least one magnetic arrangement arranged within the housing and supported by a rotor of the thermal flux generating device for generating a magnetic field;
- at least one electric drive arranged so as to facilitate movement of the magnetic arrangement relative to the at least one magnetocaloric element so as to subject the at least one magnetocaloric element to a variation in magnetic field and vary a temperature of the magnetocaloric element;
- a mechanism for collecting at least one of calories and frigories emitted by the at least one magnetocaloric element due to the variation in the magnetic field;
- the electric drive being integrated into the thermal flux generating device with the magnetocaloric material and comprising at least one electric coil equipped with a winding supported by an armature and supplied with electric current so as to generate the variation in the magnetic field which causes the movement of the rotor which supports the magnetic arrangement;
- the at least one magnetocaloric element being located on a radially inner most section of the stator, in an air gap formed between the stator and the rotor supporting the magnetic arrangement such that the at least one magnetocaloric element being directly adjacent to the magnetic arrangement so as to be subjected to a maximum magnetic flux.

* * * * *